US012729056B2

(12) United States Patent
Parenzee

(10) Patent No.: US 12,729,056 B2
(45) Date of Patent: Sep. 8, 2026

(54) STEAM HEATING SYSTEM FOR CONTAINER

(71) Applicant: TRANS OCEAN BULK LOGISTICS LTD, Southampton (GB)

(72) Inventor: Sergio Bryan Parenzee, Southampton (GB)

(73) Assignee: Trans Ocean Bulk Logistics Ltd, Southampton (GB)

( * ) Notice: Subject to any disclaimer, the term of this patent is extended or adjusted under 35 U.S.C. 154(b) by 197 days.

(21) Appl. No.: 18/031,797

(22) PCT Filed: Aug. 6, 2021

(86) PCT No.: PCT/CN2021/111104
§ 371 (c)(1),
(2) Date: Apr. 13, 2023

(87) PCT Pub. No.: WO2022/048396
PCT Pub. Date: Mar. 10, 2022

(65) Prior Publication Data

US 2025/0128876 A1 Apr. 24, 2025

(30) Foreign Application Priority Data

Sep. 7, 2020 (CN) ........................ 202010926003.3

(51) Int. Cl.
*B65D 88/74* (2006.01)
*F26B 23/10* (2006.01)

(52) U.S. Cl.
CPC ............ *B65D 88/744* (2013.01); *F26B 23/10* (2013.01)

(58) Field of Classification Search
CPC .......................... B65D 88/744; B65D 88/745; B65D 81/3484; B65D 90/046; F24D 13/024;

(Continued)

(56) References Cited

U.S. PATENT DOCUMENTS

| | | | | |
|---|---|---|---|---|
| 5,187,945 A | 2/1993 | Dixon | | |
| 2012/0247067 A1* | 10/2012 | Podd | .................... | B65D 88/745 53/127 |

FOREIGN PATENT DOCUMENTS

| | | | |
|---|---|---|---|
| CN | 2786532 Y | 6/2006 | |
| CN | 201951896 U | 8/2011 | |

(Continued)

OTHER PUBLICATIONS

Int'l Searching Authority , "International Search Report", Application No. PCT/CN2021/111104, Oct. 20, 2011, 3 pages.

(Continued)

*Primary Examiner* — Gregory A Wilson
(74) *Attorney, Agent, or Firm* — Blanchard Horton PLLC

(57) ABSTRACT

A steam heating system for a container comprises a distribution assembly and a heating assembly. The heating assembly comprises a heating plate (3) disposed on a bottom plate of a container. The heating plate (3) is a hollow plate internally provided with a plurality of through-channels (1). The distribution assembly communicates with the heating assembly, and distributes steam to all of the through-channels (1) of the heating plate (3). The steam heating system for a container has an advanced design. The heating plate in the steam heating system is positioned in place before loading or stacking of goods, and then steam is inputted to heat the entire hollow heating plate, such that the heating plate transfers heat to the goods disposed thereon to heat the goods, thereby maximizing the heating surface and improving heating efficiency. The steam released in the heating space enables heat energy to be fully utilized, thereby effectively improving heating efficiency and reducing costs. In addition, the system can be easily installed and is reusable.

8 Claims, 4 Drawing Sheets

(58) Field of Classification Search
CPC ...... F24D 2220/2081; F24D 3/12; F24D 3/14; F27D 5/0068
See application file for complete search history.

(56) References Cited

FOREIGN PATENT DOCUMENTS

| | | | | | |
|---|---|---|---|---|---|
| CN | 202449398 | U | | 9/2012 | |
| CN | 104724413 | A | * | 6/2015 | B65D 88/744 |
| CN | 105416897 | A | * | 3/2016 | B65D 88/744 |
| CN | 206125927 | U | * | 4/2017 | |
| CN | 207191970 | U | | 4/2018 | |
| CN | 207375077 | U | | 5/2018 | |
| CN | 208170986 | U | | 11/2018 | |
| CN | 110030781 | A | | 7/2019 | |
| CN | 210311391 | U | | 4/2020 | |
| CN | 21305854 | U | | 4/2021 | |
| CN | 112078986 | A | | 1/2023 | |
| EP | 2357440 | A1 | | 4/2016 | |
| EP | 2678615 | B1 | | 11/2018 | |
| KR | 100997663 | B1 | * | 12/2010 | B65D 88/744 |
| KR | 20170030948 | A | * | 3/2017 | F24H 1/12 |
| WO | WO-2009074841 | A1 | * | 6/2009 | F28D 1/06 |

OTHER PUBLICATIONS

People's Republic of China, State Intellectual Property Offi , "First Office Action", Application No. 202010926003.3, Oct. 29, 2021, 9 pages.
People's Republic of China, State Intellectual Property Offi , "Second Office Action", Application No. 202010926003.3, Mar. 17, 2022, 10 pages.
Tencent Corporation, "Steel pipe arbitrary cutting equipment, with bending function . . .", Tencent Corporation, https://v.qq.com/x/page/t0555wg6abp.html, Video, 1998, 1998.

* cited by examiner

STEAM HEATING SYSTEM FOR CONTAINER

This application claims the priority of the US2020109260033 and the filing date of 2020 Sep. 7. The content of the priority document is incorporated by reference into the application documents.

TECHNICAL FIELD

The application belongs to the field of static storage and transportation containers, and in particular relates to a container steam heating system.

BACKGROUND TECHNIQUE

A container is a group tool that can load packaged or unpackaged goods and transport them, and is convenient for loading and unloading with mechanical equipment. There are refrigerated containers, clothes hanging containers, frame containers, tank containers, refrigerated containers, platform containers, ventilated containers, thermal insulation containers, etc. Among them, when transporting liquids, it is often necessary to place disposable liquid bulk bags (liquid bags for short) to transport bulk non-hazardous liquids, which are widely used in railways, highways, sea transportation and other multi-transportation fields. When using disposable liquid bulk bags for transportation, some goods have a high melting point and are easy to crystallize and solidify at room temperature or low temperature, and cannot be unloaded by conventional means or partially melted before unloading.

The heating methods commonly used in the market generally include steam heating and electric heating. Among them, steam heating is to spread rubber heating pads on the floor of the container, and use the thermal effect to heat from the bottom. Generally, the heating time is about 24-72 hours, and the cost is low, but relatively speaking, due to the small contact area, the efficiency is low. The number of pipes, heating pads are laid at the head and around the container to improve thermal efficiency, but the cost is high and the operation is complicated, which is difficult for customers to accept. The electric heating is limited by the cost and the use environment, and the current application area is relatively narrow.

SUMMARY OF THE INVENTION

The technical problem to be solved by the present invention is to provide a container steam heating system in order to solve the deficiencies of the existing container internal heating method.

The technical scheme adopted by the present invention to solve its technical problems is: A container steam heating system includes a distribution assembly and a heating assembly, the heating assembly includes a heating plate arranged on the bottom plate of the container, the heating plate is a hollow plate with a plurality of through grooves opened inside, and the distribution assembly communicates with the heating assembly, the distribution assembly distributes the steam to all the through grooves of the heating plate.

In one of the embodiments, the through grooves extend along the length of the container.

In one of the embodiments, the heating plate includes a head portion connected to the distribution assembly and a tail portion opposite to the head portion, and the through grooves input steam at the head portion of the heating plate and output steam at the tail portion of the heating plate.

In one of the embodiments, the through-groove communicates with the inner space of the container through the rear of the heating plate.

In one embodiment, the tail portion of the heating plate is bent upward at least partially.

In one embodiment, a groove is formed on the heating plate, the groove is opened in the width direction of the heating plate, the tail of the heating plate is bent upward along the groove, and the through groove extends to the bending direction of the heating plate.

In one of the embodiments, it also includes connecting gas pipes, the heating plate has at least two, and the two ends of the connecting gas pipes are respectively connected to the through grooves of the different heating plates.

In one embodiment, the heating plates are distributed side by side, and two ends of the connecting gas pipe are respectively connected to the through grooves of the adjacent pair of the heating plates.

In one of the embodiments, the heating plate includes a head portion connected with the distribution assembly and a tail portion opposite to the head portion, and the connecting gas pipes sequentially connect the adjacent heating plates end-to-end.

In one of the embodiments, there are at least two heating plates, which are arranged side by side or side by side on the container floor.

The beneficial effects of the invention are as follows: the container steam heating system of the invention is ingeniously designed, adopts the steam heating system, the steam heating pad is laid before loading or stacking the goods, and then the whole hollow heating plate can be heated by inputting steam and conduct the heat to the upper goods. The goods are used to heat the goods above, and the heating surface is maximized to improve the heating efficiency. The steam can be released in the heating space to make full use of the heat energy, which can effectively improve the heating efficiency and save the cost of the heat source; the system is easy to install and repeatedly use.

DESCRIPTION OF THE DRAWINGS

The technical solutions of the present application will be further described below with reference to the accompanying drawings and embodiments.

DETAILED DESCRIPTION

Figure 1:
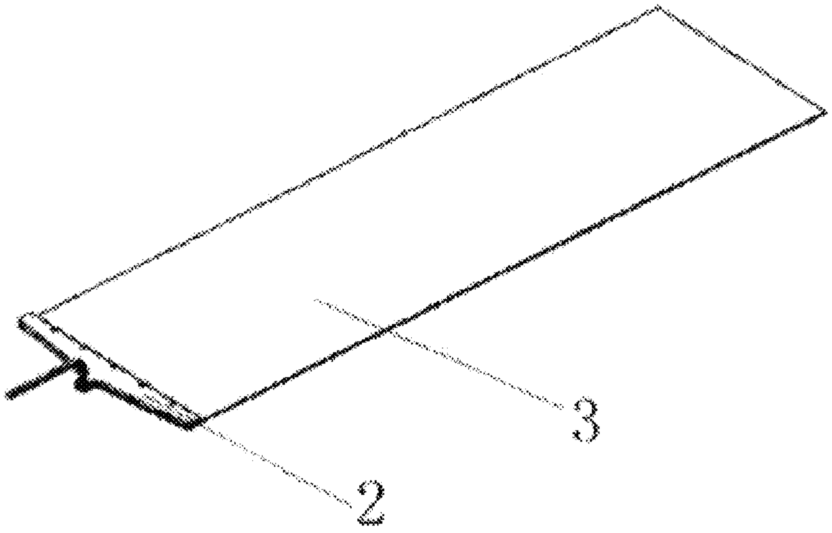
FIG. 1 is a schematic structural diagram of a container steam heating system according to an embodiment of the present application.
Figure 2:
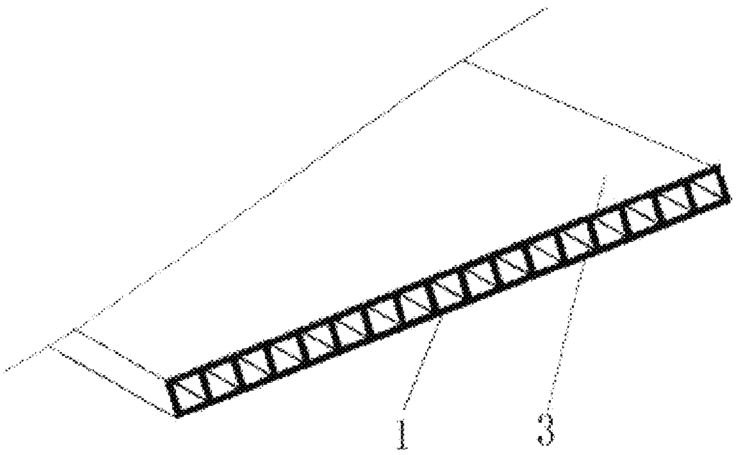
FIG. 2 is a schematic diagram of the interior of the heating plate of the container steam heating system according to the embodiment of the present application.
Figure 3:
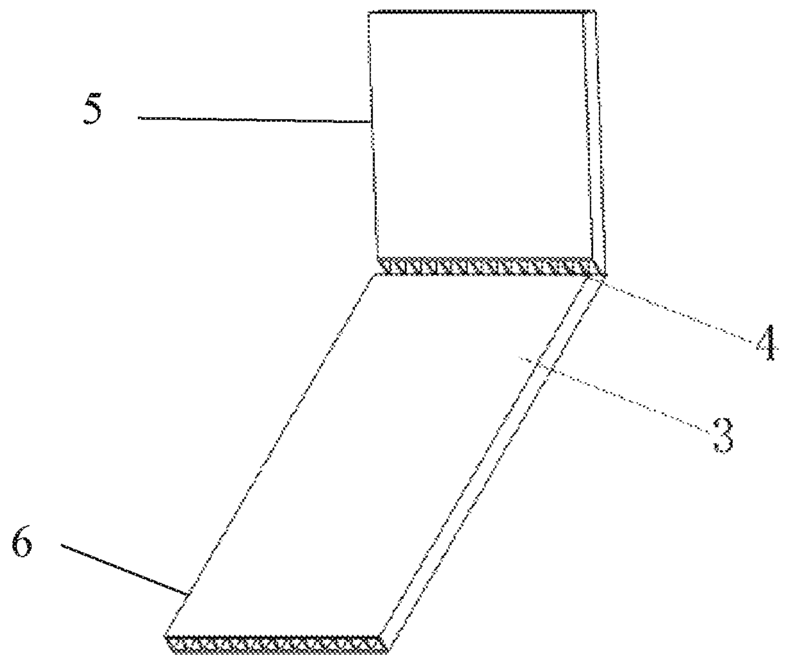
FIG. 3 is a schematic diagram of a groove of a container steam heating system according to an embodiment of the present application.
Figure 4:
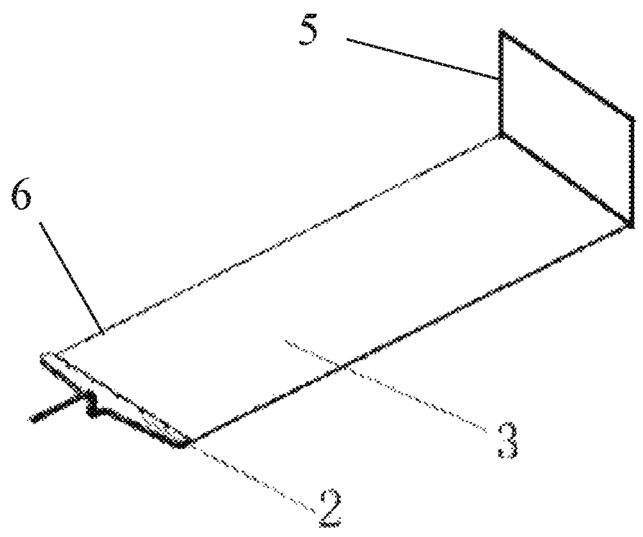
FIG. 4 is a schematic diagram of the bending of the tail of the heating plate of the container steam heating system according to the embodiment of the present application.
Figure 5:
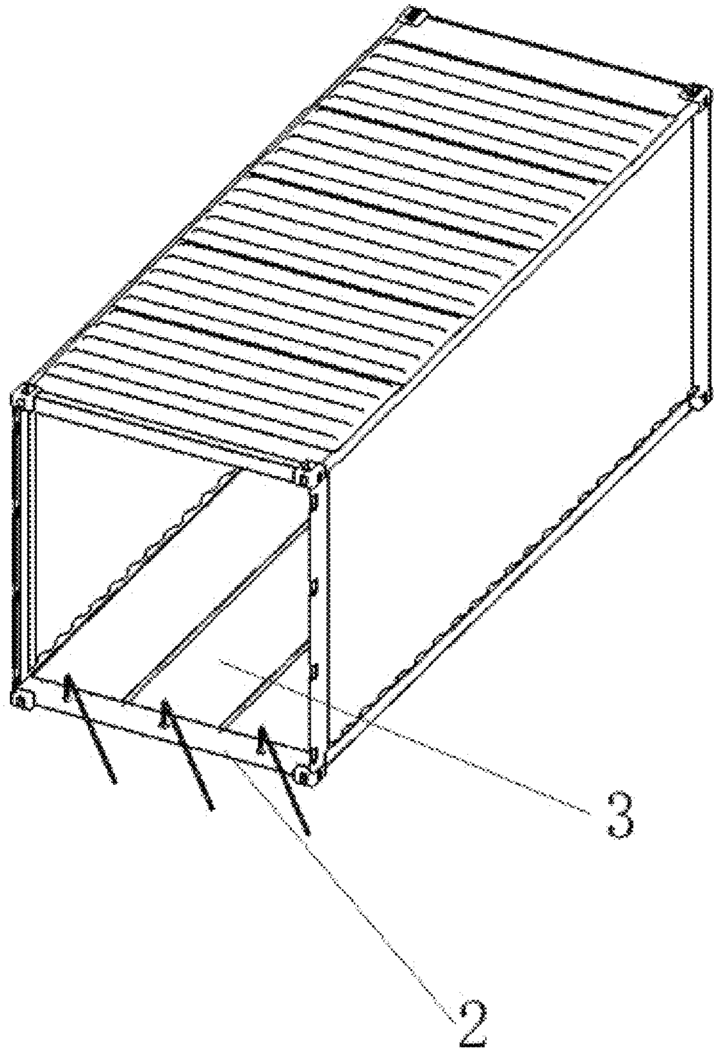
FIG. 5 is a schematic diagram of the combined use state of multiple heating plates of the container steam heating system according to the embodiment of the present application.
Figure 6:
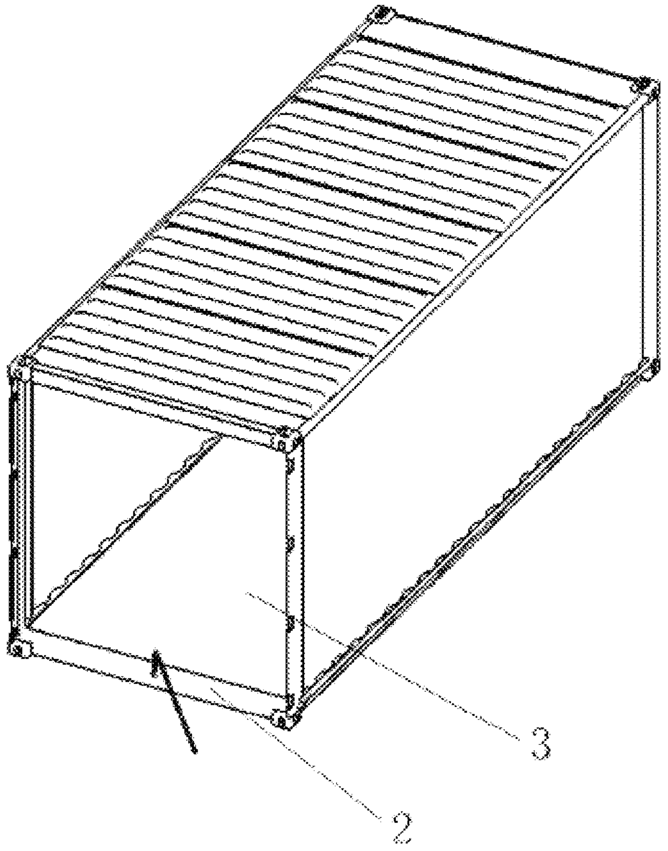
FIG. 6 is a schematic diagram of the use state of a single heating plate of the container steam heating system according to the embodiment of the present application.

It should be noted that the embodiments in the present application and the features of the embodiments may be combined with each other in the case of no conflict.

In the description of this application, it should be understood that the terms “center”, “portrait”, “horizontal”, “top”, “bottom”, “front”, “rear”, “left”, “right”, “The orientations or positional relationships indicated by vertical, horizontal, top, bottom, inner, and outer are based on the orientations or positional relationships shown in the accompanying drawings, and are only for the convenience of describing the present application and The description is simplified rather than indicating or implying that the referred device or element must have a specific orientation, be constructed and operate in a specific orientation, and therefore should not be construed as limiting the scope of protection of the present application. In addition, the terms “first”, “second”, etc. are used for descriptive purposes only, and should not be construed as indicating or implying relative importance or implying the number of indicated technical features. Thus, a feature defined as “first”, “second”, etc., may expressly or implicitly include one or more of that feature. In the description of the present invention, unless otherwise specified, “plurality” means two or more.

In the description of this application, it should be noted that, unless otherwise expressly specified and limited, the terms “installed”, “connected” and “connected” should be understood in a broad sense, for example, it may be a fixed connection or a detachable connection, or integral connection; can be mechanical connection, can also be electrical connection; can be directly connected, can also be indirectly connected through an intermediate medium, can be internal communication between two elements. For those of ordinary skill in the art, the specific meanings of the above terms in the present application can be understood through specific situations.

The technical solutions of the present application will be described in detail below with reference to the accompanying drawings and in conjunction with the embodiments.

A container steam heating system includes a heat source, a distribution component and a heating component, the heat source includes a steam generator, and the heating component includes a heating plate 3 arranged on the bottom of the container, and an object to be heated, such as a liquid bag, can be placed on the heating plate 3. In order to fully and evenly heat the liquid bag and the like, the heating plate 3 is a hollow plate with a number of through-grooves 1 opened inside. The steam of the generator is distributed into all the through grooves 1 of the heating plate 3, and the steam heats and maintains the heating plate 3 and its upper heating object in the through grooves 1. The through-grooves 1 in the embodiment may be arranged in parallel with each other and arranged at equal or different intervals.

In one of the embodiments, the through groove 1 extends along the length direction of the container. The height inside the container is the distance from the bottom surface of the box to the bottom of the top plate, the width is the distance between the two inner lining plates, and the length is the distance between the inner plate of the box door and the inner lining plate of the end wall. Most of the containers are of standard specifications, and the through groove 1 extends along the length of the container to facilitate the introduction of steam from the outside, such as from the door of the container, and the steam is evenly distributed at the bottom of the container to thoroughly heat the interior of the container.

In one embodiment, the heating plate 3 includes a head portion 5 connected to the distribution assembly and a tail portion 6 opposite to the head portion, and the through slot 1 inputs steam at the head portion of the heating plate 3 and outputs steam at the tail portion of the heating plate 3.

In one of the embodiments, the through groove 1 is connected to the inner space of the container from the end of the heating plate 3, that is, the through groove 1 passes through the entire heating plate 3 and is not closed at the end, and directly communicates with the outside of the heating plate 3. In different embodiments, the through groove 1 can be closed at the tail if it is necessary to retain steam.

In one of the embodiments, at least part of the tail of the heating plate 3 is bent upwards, so that the tail of the heating plate 3 produces a chimney effect, which is conducive to the diffusion of steam into the container.

In one embodiment, the heating plate 3 is provided with a groove, the groove is opened in the width direction of the heating plate 3 (i.e., the width direction of the container), and the tail of the heating plate 3 is bent upward along the groove, which is convenient to form an L-shaped tail shape, the through groove extends to the bent heating plate, and the steam is exhausted upwards after reaching the rear of the heating plate 3. In one embodiment, the grooves are V-grooves.

In one of the embodiments, a connecting gas pipe is also included, the heating plate 3 has at least two, and the two ends of the connecting gas pipe are respectively connected to the through grooves 1 of different heating plates 3. A plurality of heating plates 3 are connected or separated, the heating area can be adjusted, and the use cost of the steam and the steam generator can be saved. In one embodiment, the heating plates 3 are arranged side by side, and the two ends of the connecting gas pipes are respectively connected to the through grooves 1 of the adjacent pair of heating plates 3.

In one of the embodiments, the heating plate 3 includes a head part connected to the distribution assembly and a tail part opposite to the head part, and the connecting gas pipes connect the adjacent heating plates 3 end to end in turn to form a steam-circulating heating system. The heating plate 3 can be further communicated, and the steam realizes a complete internal circulation, which not only saves energy, but also prevents the influence of the external environment.

In one of the embodiments, there are at least two heating plates 3, which are arranged side by side or side by side on the bottom plate of the container, there is no communication relationship between the heating plates 3, and they are only laid flat on the bottom of the container.

In one of the embodiments, the distribution component is a high temperature resistant plastic part 2 which is hollow inside. The plastic part 2 includes an inlet end communicated with the steam generator and a plurality of outlet ends communicated with the through grooves 1 in a one-to-one correspondence. A plastic part 2 is used to connect the steam input pipe of the steam generator and the heating plate 3, so that the input steam enters the through groove 1 and passes through the whole heating plate 3, so as to maximize the heating surface and improve the heating efficiency.

The through groove 1 communicates with the plastic part 2 and the inner space of the container. The heating plate 3 or the steam heating pad is laid before loading or stacking the goods, and then the whole hollow heating plate 3 can be heated by inputting steam and conduct heat to the goods above, so as to achieve the purpose of heating the goods above. The steam is released into the inner space of the container through the opening at the end of the bent portion of the heating plate 3.

In one embodiment, the heating plate 3 includes a top plate, a bottom plate horizontal to the top plate, and a pair of side plates respectively connecting the top plate and the bottom plate. A number of partition plates are also arranged between the top plate and the bottom plate, and the partition plates are vertically fixed on the top plate and the bottom plate. It not only supports the top plate, but also separates the space enclosed by the top plate, the bottom plate and the side plate into a plurality of through grooves 1.

In one of the embodiments, the splicing assemblies are fixed on the side plates, and the splicing assemblies on different heating plates 3 are connected to each other so that the heating plates 3 are connected side by side with each other. Of course, different heating plates 3 can also be directly laid side by side on the bottom of the container, for example, two or three heating plates 3 can be laid side by side to cover the bottom of the container. In one embodiment, the splicing assembly includes a latch lock, and a pair of side plates of the heating plate 3 are respectively fixed with a latch lock sleeve and a lock rod corresponding to the lock sleeve. The locks lock against each other to prevent displacement.

In one of the embodiments, the heating plate 3 has a groove 4, and the heating plate 3 can be folded along the groove 4. The grooves 4 can be opened along the length or width direction of the heating plate, so that the heating plate 3 can be folded from different directions to suit different space laying requirements. Since the heating plate 3 has a large area, the folded heating plate 3 is convenient for storage and transportation when not in use. For example, the groove 4 is V-shaped: when the heating plate 3 is folded up along the groove 4, the steam can be discharged upward; after the heating plate 3 is reversely folded along the groove 4, the heating plate 3 can be completely folded for storage and transportation. In addition, the opening of the grooves 4 can also provide flexibility for the heating plate 3, and the heating plate 3 can be slightly bent to adapt to the undulating laying surface. After the above-mentioned groove 4 is opened, the through groove 1 exposed at the groove 4 can be further closed to prevent the steam from flowing out of the groove 4. Or keep it as it is, the steam can flow out from the groove 4, and the groove 4 opened according to the needs can increase the steam outlet, and the released heat can heat the goods above the place.

In one embodiment, the plastic part 2 is provided with a number of switches, which correspond to the gas outlet end one-to-one and control the opening and closing of the gas outlet end, so as to facilitate the adjustment of the on-off of the steam in the through groove 1 and finely manage the heating of the goods. In one of the embodiments, a control assembly is also included, and the control assembly is connected to and controls the steam generator and the opening and closing of the switch. The control component can include a computer, through which the steam generator and the switch are automatically controlled to open and close, so as to achieve the effect of automatic management.

The heating plate 3 is made of a material that can withstand a high temperature of 100 degrees or more. In one embodiment, the heating plate 3 is made of plastic or stainless steel.

The beneficial effects of the invention are as follows: the container steam heating system of the invention is ingeniously designed, adopts the steam heating system, the steam heating pad is laid before loading or stacking the goods, and then the whole hollow heating plate can be heated by inputting steam and conduct the heat to the upper goods. The goods are used to heat the goods above, and the heating surface is maximized to improve the heating efficiency. The steam can be released in the heating space to make full use of the heat energy, which can effectively improve the heating efficiency and save costs; the system is easy to install and reusable.

Taking the above ideal embodiments according to the present application as inspiration, and through the above descriptions, relevant personnel can make various changes and modifications without departing from the technical idea of the present application. The technical scope of the present application is not limited to the content in the description, and the technical scope must be determined according to the scope of the claims.

The invention claimed is:

1. A container steam heating system; comprising:

a heating plate having a head portion for arrangement on a bottom plate of a container and a tail portion extending along a first edge of the head portion, the heating plate forming a V-shaped groove along an interface between the head portion and the tail portion, the heating plate defining a first plurality of through channels extending from the V-shaped groove through the head portion to a second edge of the head portion and a second plurality of through channels extending from the V-shaped groove through the tail portion to an edge of the tail portion opposite the V-shaped groove; and a distribution assembly in communication with the heating plate, the distribution assembly configured to distribute steam into at least one of the first and second plurality of through channels of the heating plate;

wherein when the tail portion of the heating plate is bent along the V-shaped groove, the V-shaped groove closes to bring the first plurality of through channels into fluid communication with the second plurality of through channels.

2. The container steam heating system of claim 1, wherein the first plurality of through channels extended along a length direction of the container.

3. The container steam heating system of claim 1, wherein when the tail portion of the heating plate is bent along the V-shaped groove, the distribution assembly inputs steam at an end of the head portion opposite the V-shaped groove, and steam is output from an end of the tail portion opposite the V-shaped groove.

4. The container steam heating system of claim 3, wherein the second plurality of through openings open to the end of the tail portion opposite the V-shaped groove.

5. The container steam heating system of claim 1 further comprising connecting gas pipes connectable to through channels of different heating plates.

6. The container steam heating system of claim 5, wherein multiple heating plates are distributed side by side, and the connecting gas pipes are respectively connected to the through openings of adjacent pairs of the heating plates.

7. The container steam heating system of claim 6, wherein the connecting gas pipes sequentially connect adjacent heating plates end to end.

8. The container steam heating system according to any one preceding claim, wherein at least two heating plates are provided and arranged side by side or end to end on a container floor.

* * * * *